United States Patent [19]

Asai

[11] Patent Number: 5,758,864
[45] Date of Patent: Jun. 2, 1998

[54] VALVE STRUCTURE

[75] Inventor: Hakuji Asai, Nagoya, Japan

[73] Assignee: Takasago Electric, Inc., Nagoya, Japan

[21] Appl. No.: 628,033

[22] Filed: Apr. 4, 1996

[51] Int. Cl.$^6$ ............................................. F16K 31/06
[52] U.S. Cl. ........................ 251/129.17; 251/331; 251/332
[58] Field of Search .................. 251/129.17, 129.15, 251/331, 359, 332; 137/516.29

[56] References Cited

U.S. PATENT DOCUMENTS

| | | | |
|---|---|---|---|
| 2,107,200 | 2/1938 | Kennon | 251/332 |
| 2,461,772 | 2/1949 | Ray | 251/129.17 X |
| 2,610,021 | 9/1952 | Smith | 251/332 |
| 2,959,392 | 11/1960 | Platen et al. | 251/332 |
| 2,995,057 | 8/1961 | Nenzell | 251/332 X |
| 3,787,026 | 1/1974 | Lazar. | |
| 4,168,724 | 9/1979 | Graffunder et al. | |
| 4,558,845 | 12/1985 | Hunkapiller. | |
| 4,703,913 | 11/1987 | Hunkapiller. | |
| 4,732,362 | 3/1988 | Morioka et al. | 251/129.15 X |
| 5,083,746 | 1/1992 | Fransworth | 251/129.17 |
| 5,139,042 | 8/1992 | Calhoun | 251/359 X |

*Primary Examiner*—Kevin Lee
*Attorney, Agent, or Firm*—Lahive & Cockfield, LLP

[57] ABSTRACT

The valve structure of the present invention can completely eliminate the dead volume of a valve in closed position, thereby enhancing the precision and reliability of measurement. A valve chamber (3) is divided into an upper portion and a lower portion by a diaphragm (6). The whole circumference of the diaphragm (6) is fixed on the same level as the bottom of the valve chamber (3). A fluid inlet port (4a) is formed on the substantial center of the bottom face of the valve chamber (3). A stepped hole (7) is arranged concentrically with the fluid inlet port (4a) open to the valve chamber (3). A valve seat (8) composed of perfluoroelastomer has a stepped element (8a) which corresponds to and is fitted in the stepped hole (7). A valve disc (10) projected through the bottom face of the diaphragm (6) is pressed against a ring projection (8b) of the valve seat (8) protruded into the valve chamber (3). The diaphragm (6) presses against the bottom of the valve chamber in the closed position and thereby eliminates the dead volume.

8 Claims, 5 Drawing Sheets

200

VALVE STRUCTURE

BACKGROUND OF THE INVENTION

1. Field of the Invention

The present invention relates to a valve structure having a diaphragm.

2. Description of the Related Art

FIGS. 4A and 4B show a conventional valve structure in closed position and open position, respectively. In the conventional valve structure of FIGS. 4A and 4B, a fluid inlet port 204b and a fluid outlet port 205b are arranged on a specific plane in a valve chamber 203 while a diaphragm 206 partitions the valve chamber 203 into an upper portion and a lower portion; the lower portion with the fluid inlet port 204b and the fluid outlet port 205b and the upper portion without any port. A valve disc 210 is formed on the axial center of the diaphragm 206, and a rod 209 projected into the diaphragm 206 is driven, for example, by a solenoid (not shown).

The fluid inlet port 204b defined by a peripheral member is formed on a higher level to enhance the air tightness of the valve in the closed position shown in FIG. 4A. The fluid outlet port 205b is, on the other hand, formed on a lower level.

There is a dead volume 211 between the diaphragm 206 and the fluid outlet port 205b when the solenoid valve is in the closed position as shown in FIG. 4A, that is, when the fluid inlet port 204b is blocked by the valve disc 210.

Even if the diaphragm 206 is arranged closer to the fluid inlet port 204b and the fluid outlet port 205b, the difference in level between the fluid inlet port 204b and the fluid outlet port 205b makes it impossible to completely eliminate the dead volume 211.

When the conventional valve of such structure is used in high-precision instruments, such as analyzers, a certain amount of a reagent or liquid sample existing in the dead volume causes errors in measurements and lowers the precision of analyses.

When an expensive reagent of limited volume is used for analyses, even a trace amount of the reagent in the dead volume significantly increases the cost of analyses.

The dead volume in the valve undesirably increases the time as well as the amount of a reagent or liquid sample required for washing the inside of the valve prior to measurement of new samples.

In solenoid-operated valves, heat produced through the operation of a solenoid may vaporize part of the liquid existing in the dead volume to generate bubbles. The bubbles cause significant errors in measurements and lower the reliability of measurements.

SUMMARY OF THE INVENTION

The object of the present invention is to completely eliminate the dead volume of a valve in closed position, thereby enhancing the precision and reliability of measurement.

The above and the other related objects are realized by a first valve structure having a fluid inlet port and a fluid outlet port arranged on a specific plane in a valve chamber. The first valve structure further includes

- a diaphragm having a whole circumference thereof fixed on a level identical with the specific plane, which the fluid inlet port and the fluid outlet port are placed on,
- a valve disc arranged on a substantial center of the diaphragm, the valve disc moving between a closed position and an open position, and
- a peripheral member for defining the fluid inlet port, the peripheral member being composed of a resilient material and having a projection element protruding into the valve chamber, wherein the valve disc is pressed against the peripheral member of the fluid inlet port in the closed position, so that the projection element of the resilient peripheral member is compressed by a bottom face of the valve disc to prevent a fluid from flowing through the fluid inlet port, while a bottom face of the diaphragm being in close contact with the fluid outlet port to prevent the fluid from flowing through the fluid outlet port, the valve disc being separated from the peripheral member of the fluid inlet port in the open position, so that the projection element of the resilient peripheral member being restored to allow the fluid to flow through the fluid inlet port, while the bottom face of the diaphragm being separated from the fluid outlet port to allow the fluid to flow through the fluid outlet port.

In the open position, the valve disc is separated from the fluid inlet port defined by the peripheral member, and the projection element of the peripheral member is restored and protruded into the valve chest. The bottom face of the diaphragm is separated from the fluid outlet port. The fluid inlet port is accordingly connected to the fluid outlet port via a space defined by the bottom face of the diaphragm and the top face of the projection element of the peripheral member.

In the closed position, the valve disc is pressed against the peripheral member of the fluid inlet port, and the projection element of the resilient peripheral member is compressed by the bottom face of the valve disc. This effectively blocks the fluid inlet port and prevents a fluid from flowing through the fluid inlet port. The bottom face of the diaphragm is in close contact with the fluid outlet port to prevent the fluid from flowing through the fluid outlet port.

In the first valve structure of the present invention, the bottom face of the diaphragm is in close contact with the fluid outlet port. There is accordingly no dead volume between the diaphragm and the fluid outlet port, which is observed in the conventional valve structure.

In accordance with one preferred embodiment, the peripheral member may include

- a stepped hole arranged concentrically with the fluid inlet port open to the valve chamber, and
- a valve seat composed of a resilient material, the valve seat having a stepped element on a circumference thereof corresponding to and fitted in the stepped hole.

In this preferred structure, the above effects are attained simply by fitting the valve seat into the stepped hole. Engagement of the stepped element of the valve seat with the stepped hole effectively prevents the valve seat from being slipped off the hole.

The present invention is also directed to a second valve structure having a fluid inlet port and a fluid outlet port arranged on a specific plane in a valve chest. Specifically, the inlet ports are formed on a bottom flat face of the valve. The second valve structure further includes

- a diaphragm having a whole circumference thereof fixed on a level identical with the specific plane, which the fluid inlet port and the fluid outlet port are placed on,
- a peripheral member for defining the fluid inlet port, and
- a resilient valve disc arranged on a substantial center of the diaphragm, the valve disc moving between a closed position and an open position, the valve disc having a resilient disc-like projection protruding out of a portion of a bottom face of the diaphragm corresponding in location to the fluid inlet port, wherein the resilient projection of the valve disc is pressed against one of the fluid inlet port and the flat face of the valve in the closed position, so that the disc-like projection of the resilient valve disc is compressed to a level substantially identical with the flat face of the diaphragm, thereby preventing a fluid from flowing through the fluid inlet port, while the bottom face of the diaphragm contacts the valve flat face to eliminate a valve chamber, the valve disc being separated from the peripheral member of the fluid inlet port in the open position, so that the disc-like projection of the resilient valve disc being restored to allow the fluid to flow through the fluid inlet port, while of the diaphragm curves upward to form the valve chamber.

In the open position, the valve disc is separated from the fluid inlet port defined by the peripheral member, and the disc-like projection of the valve disc is restored and protruded through the bottom face of the diaphragm. The bottom face of the diaphragm is separated from the fluid outlet port. The fluid inlet port is accordingly connected to the fluid outlet port via a space defined by the bottom face of the disc-like projection, the bottom face of the diaphragm, and the top face of the peripheral member.

In the closed position, the valve disc is pressed against the peripheral member of the fluid inlet port, and the disc-like projection of the resilient valve disc is compressed by the top face of the peripheral member. This effectively blocks the fluid inlet port and prevents a fluid from flowing through the fluid inlet port. The bottom face of the diaphragm is in close contact with the fluid outlet port to prevent the fluid from flowing through the fluid outlet port.

In the second valve structure of the present invention, the bottom face of the diaphragm is in close contact with the fluid outlet port. There is accordingly no dead volume between the diaphragm and the fluid outlet port, which is observed in the conventional valve structure.

The valve structure of the present invention may be applied to a solenoid-operated valve. In accordance with one preferred application of the present invention, a first solenoid-operated valve having a fluid inlet port and a fluid outlet port arranged on a specific plane in a valve chest includes a diaphragm having a whole circumference thereof fixed on a level identical with the specific plane, which the fluid inlet port and the fluid outlet port are placed on, a valve disc formed in a rod to be arranged on a substantial center of and having a flat portion disposed on a portion of the diaphragm corresponding to the location of the fluid inlet port, the valve disc being driven by means of a solenoid connected with the rod to move between a closed position and an open position, and a peripheral member for defining the fluid inlet port, the peripheral member being composed of a resilient material and having a projection element protruding into the valve chamber, wherein the valve disc is pressed against the peripheral member of the fluid inlet port in the closed position, so that the projection element of the resilient peripheral member is compressed by a bottom face of the valve disc to a level substantially identical with the flat face of the valve, to prevent a fluid from flowing through the fluid inlet port, while a bottom face of the diaphragm contacts the flat face of the valve to close through the fluid outlet port, the valve disc being separated from the peripheral member of the fluid inlet port in the open position, so that the projection element of the resilient peripheral member being restored to allow the fluid to flow through the fluid inlet port, while the bottom face of the diaphragm is separated and curves upward from the valve chamber.

In accordance with another application of the present invention, a second solenoid-operated valve having a fluid inlet port and a fluid outlet port arranged on a specific plane in a valve chamber includes a diaphragm having a whole circumference thereof fixed on a level identical with the specific plane, which the fluid inlet port and the fluid outlet port are placed on, a peripheral member for defining the fluid inlet port, and a resilient valve disc formed in a rod to be arranged on a substantial center of the diaphragm, the valve disc being driven by means of a solenoid connected with the rod to move between a closed position and an open position, the valve disc having a disc-like projection protruded out of a bottom face of the diaphragm, wherein the valve disc is pressed against the peripheral member of the fluid inlet port in the closed position, so that the disc-like projection of the resilient valve disc is compressed by a top face of the peripheral member to prevent a fluid from flowing through the fluid inlet port, while the bottom face of the diaphragm being in close contact with the fluid outlet port to prevent the fluid from flowing through the fluid outlet port, the valve disc being separated from the peripheral member of the fluid inlet port in the open position, so that the disc-like projection of the resilient valve disc being restored to allow the fluid to flow through the fluid inlet port, while the bottom face of the diaphragm being separated from the fluid outlet port to allow the fluid to flow through the fluid outlet port.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
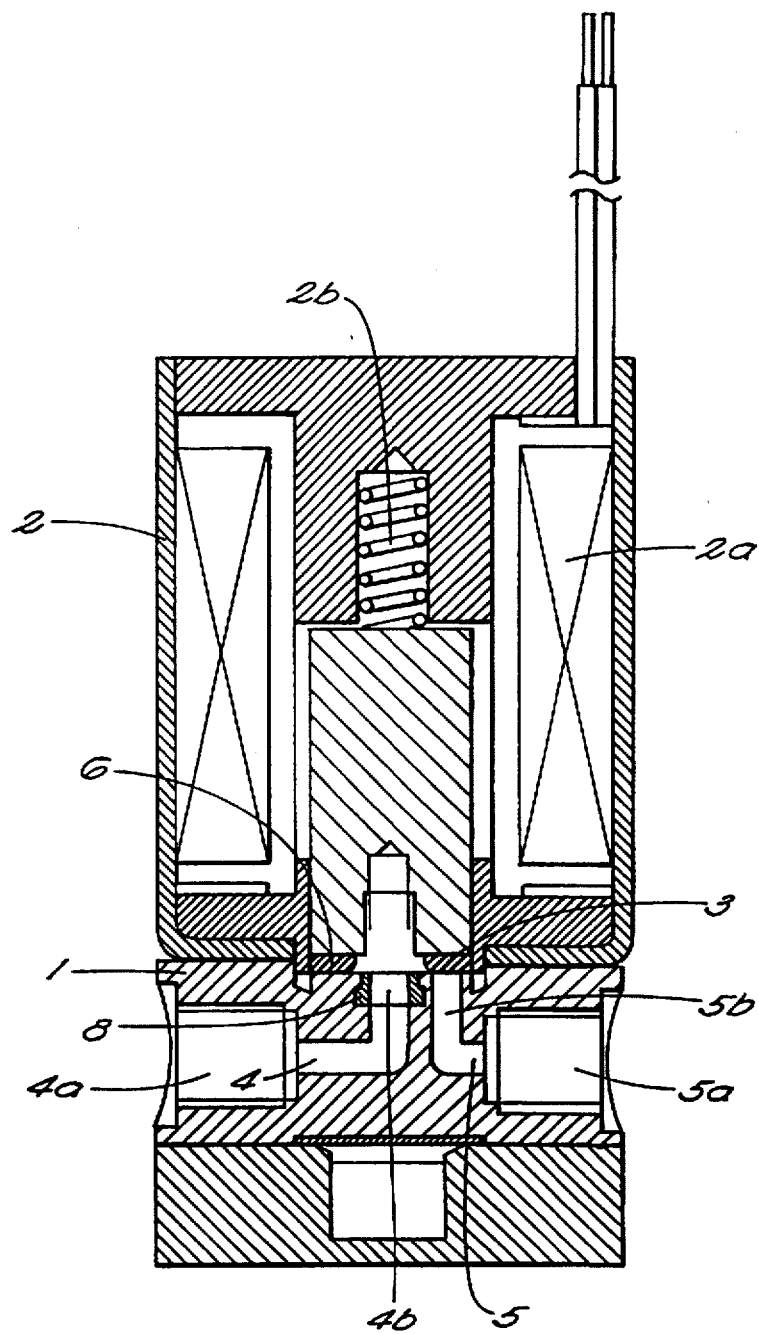
FIG. 1 shows a valve structure embodying the present invention applied to a solenoid valve.
Figure 2A:
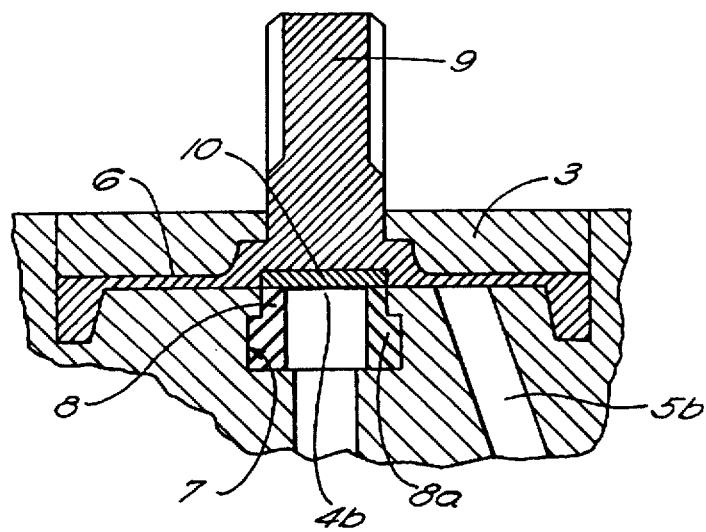
FIGS. 2A and 2B show the solenoid valve of the embodiment in closed position and open position.
Figure 2B:
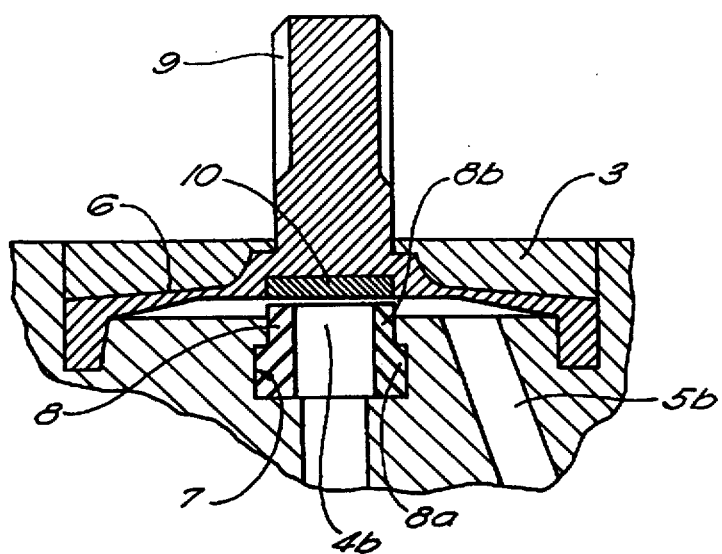

FIG. 1 shows a valve body embodying the present invention applied to a solenoid valve; and FIGS. 2A and 2B show the solenoid valve of the embodiment in closed position and open position, respectively.

Referring to FIG. 1, a valve body 1 is driven by means of a solenoid 2 attached thereto. The valve body 1 includes a valve chamber 3, a fluid supply conduit 4, and a fluid discharge conduit 5. The fluid supply conduit 4 and the fluid discharge conduit 5 connect the valve chamber 3 respectively with connection ports 4a and 5a. A diaphragm 6 directly driven by means of the solenoid 2 is placed in the valve chamber 3.

A fluid inlet port 4b connecting with the fluid supply conduit 4 is formed in the bottom face of the valve chamber 3 to be arranged on a substantial center of the valve chest 3. A stepped hole 7 is arranged concentrically with the fluid inlet port 4b open to the valve chamber 3 as shown in FIGS. 2A and 2B. The stepped hole 7 includes a smaller-diametral upper portion and a larger-diametral lower portion. A valve seat 8 composed of perfluoro-elastomer has a stepped element 8a on a circumference thereof, which corresponds to and is fitted in the stepped hole 7. A ring-like projection element 8b of the valve seat 8 is protruded into the valve chamber 3 when the stepped element 8a of the valve seat 8 is fitted into the stepped hole 7. The stepped element 8a of the valve seat 8 works to prevent the valve seat 8 from being slipped off the stepped hole 7.

A fluid outlet port 5b connecting with the fluid discharge conduit 5 is formed in the bottom face of the valve chamber 3 to be arranged besides the fluid inlet port 4b.

The diaphragm 6 has a whole circumference thereof fixed on a level identical with the bottom face of the valve chamber 3, that is, a level of a specific plane on which the fluid inlet port 4b and the fluid outlet port 5b are placed. The bottom face of the diaphragm 6 is in close contact with the bottom face of the valve chamber 3 when the valve body 1 is in closed position.

A rod 9 connected with the solenoid 2 is projected upright from the substantial center of the diaphragm 6. A valve disc 10 is integrally joined with the bottom face of the rod 9 to be in direct contact with the valve seat 8 when the valve body 1 is in the closed position.

In the solenoid-operated valve thus constructed, when no electricity is supplied to a coil 2a of the solenoid 2, the valve body 1 is set in closed position as shown in FIG. 2A. Restoring force of a spring 2b presses the valve disc 10 arranged on the substantial center of the diaphragm 6 against the valve seat 8, which defines the fluid inlet port 4b. The ring-like projection element 8b of the resilient valve seat 8 is compressed by the bottom face of the valve disc 10, thereby blocking the fluid inlet port 4b and preventing a fluid from flowing through the fluid inlet port 4b. The bottom face of the diaphragm 6 is also in close contact with the fluid outlet port 5b to prevent the fluid from flowing through the fluid outlet port 5b. Since the bottom face of the diaphragm 6 is in close contact with the bottom face of the valve chamber 3, there is no dead volume between the diaphragm 6 and the fluid outlet port 5b, which is observed in the conventional valve structure.

When electricity is supplied to the coil 2a of the solenoid 2, the valve body 1 is set in open position as shown in FIG. 2B. The central portion of the diaphragm 6 is pulled upward by the solenoid 2, and the valve disc 10 is separated from the valve seat 8 defining the fluid inlet port 4b. The ring-like projection element 8b of the resilient valve seat 8 is thus restored to allow the fluid to flow through the fluid inlet port 4b. The bottom face of the diaphragm 6 is also separated from the fluid outlet port 5b to allow the fluid to flow through the fluid outlet port 5b. The fluid inlet port 4b is accordingly connected to the fluid outlet port 5b via a space defined by the bottom face of the diaphragm 6 and the top face of the ring-like projection element 8b of the valve seat 8.

When the valve body 1 is in the open position, a fluid can be fed smoothly from the fluid inlet port 4b to the fluid outlet port 5b. When the valve body 1 is in the closed position, on the other hand, the ring-like projection element 8b of the valve seat 8 is compressed by the bottom face of the valve disc 10 to the level of the valve inlet port 4b and the valve outlet port 5b. This structure ensures the high air tightness and completely eliminates the dead volume.

In the valve body 1 of FIGS. 2A and 2B, the valve seat 8 is composed of a resilient material and provided with the ring-like projection element 8b, which is compressed by the bottom face of the valve disc 10. In accordance with a modified structure shown in FIGS. 3A and 3B, a valve disc 110 integrally joined with a bottom face of a rod 109 is composed of a resilient material, such as perfluoro-elastomer, and has a disc-like projection protruded out of a bottom face of a diaphragm 106. A valve seat for defining a flow inlet port 104b open to a valve chamber 103 has a flat top face.

Figure 3A:
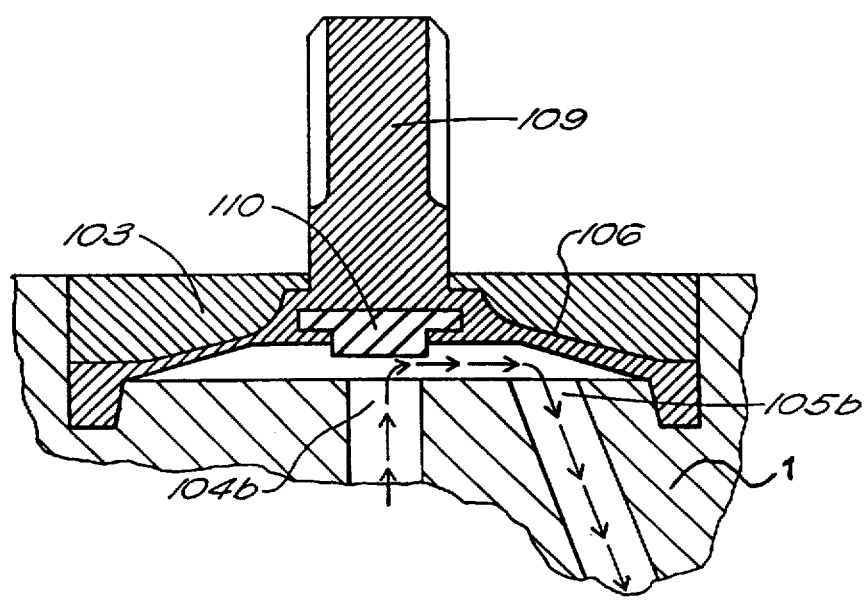
FIGS. 3A and 3B show a modification of the valve disc in the open and closed positions, respectively.
Figure 3B:
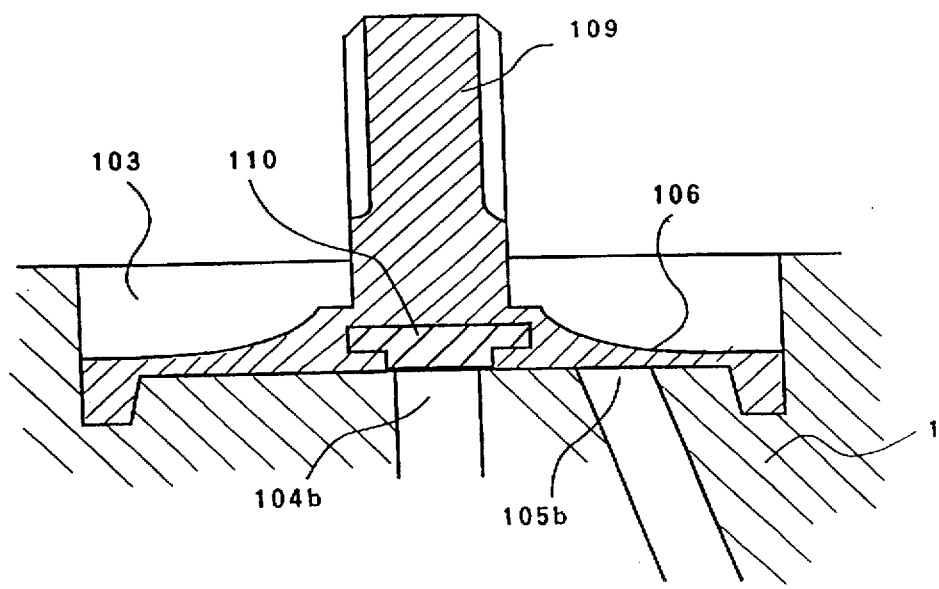
Figure 4A:
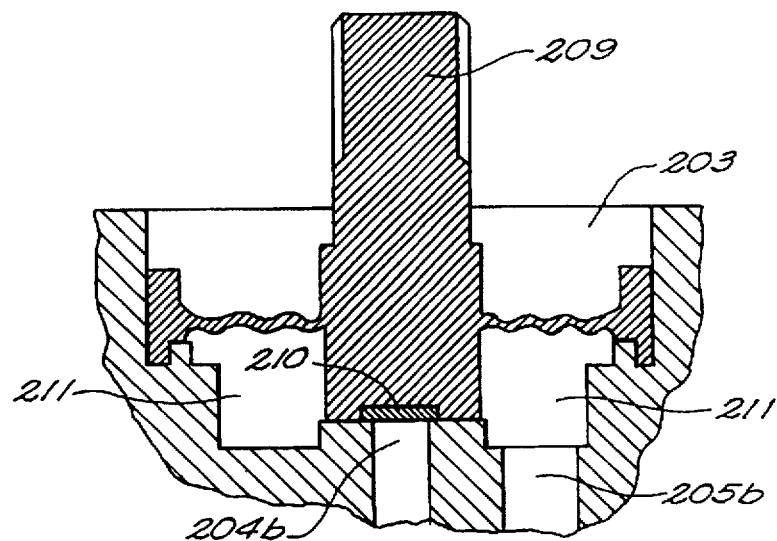
FIGS. 4A and 4B show a conventional valve structure in closed position and open position.
Figure 4B:
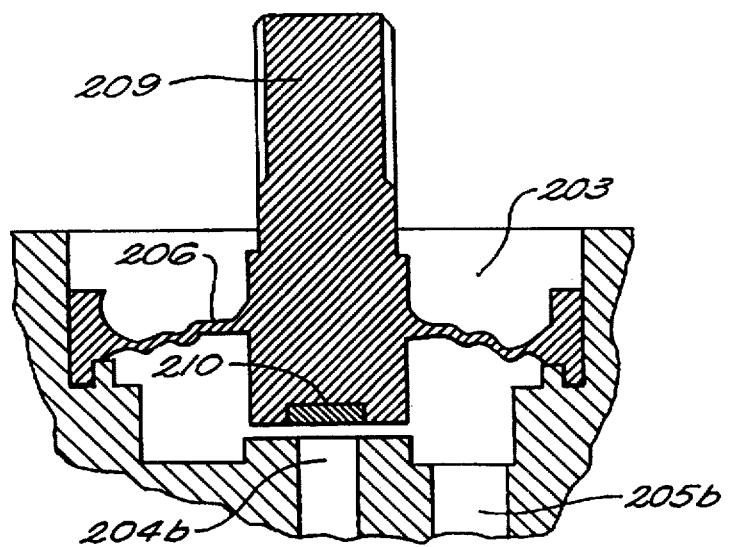

In the open position as illustrated in FIG. 3A, the valve disc 110 is separated from the fluid inlet port 104b, and the disc-like projection of the valve disc 110 is restored and protruded through the bottom face of the diaphragm 106. The bottom face of the diaphragm 106 is also separated from a fluid outlet port 105b. The fluid inlet port 104b is accordingly connected to the fluid outlet port 105b via a space defined by the bottom face of the disc-like projection, the bottom face of the diaphragm 106, and the top face of the valve seat.

In the closed position, as illustrated in FIG. 3A, the valve disc 110 is pressed against the valve seat of the fluid inlet port 104b, and the disc-like projection of the resilient valve disc 110 is compressed by the top face of the valve seat. This effectively blocks the fluid inlet port 104b and prevents a fluid from flowing through the fluid inlet port 104b. The bottom face of the diaphragm 106 is in close contact with the fluid outlet port 105b to prevent the fluid from flowing through the fluid outlet port 105b.

This structure exerts the same effects as those of the valve body 1 of the above embodiment.

The valve seat may be composed of fluororubber or silicone rubber other than perfluoro-elastomer of the embodiment. In accordance with another possible structure, the ring-like projection element protruded to the valve chamber may be attached to the valve seat through the screw-like engagement or adhesion.

Although the valve structure of the invention is applied to a solenoid-operated valve in the above embodiment, it may be applied to other valves. The diaphragm may be driven by different means.

There may be many other modifications, alterations, and changes without departing from the scope or spirit of essential characteristics of the invention. It is thus clearly understood that the above embodiment is only illustrative and not restrictive in any sense. The scope and spirit of the present invention are limited only by the terms of the appended claims.

What is claimed is:

1. A valve structure being alternately disposable between an open position and a closed position, said valve structure comprising a valve body having a flat face, and at least one fluid inlet port and at least one fluid outlet port which open onto said flat face, a diaphragm having a top face, a bottom face and a circumference, said circumference of said diaphragm being fixed to said flat face of said valve body to seal out a fluid and to prevent said fluid from flowing to said diaphragm top face, said bottom face of said diaphragm being spaced from and curving away from said flat face of said valve body in said open position to form a valve chamber, said valve body flat face forming a bottom of said valve chamber and said bottom face of said diaphragm forming a top of said valve chamber, a valve disc arranged on a substantial center of said diaphragm, said valve disc being movable between the closed position and the open position, and a peripheral member coupled to said flat face of said valve body for defining said fluid inlet port, said peripheral member being composed of a resilient material and having a projection element protruding into said valve chamber, wherein when said valve structure is disposed in said open position, said valve disc and a portion of said diaphragm are spaced from an upper portion of said peripheral member to form said valve chamber and to allow fluid to flow into said valve chamber from said fluid inlet and out of said chamber through said fluid outlet, said upper portion of said peripheral member extending into said valve chamber, and wherein when said valve structure is disposed in said closed position, said valve disc and said diaphragm are urged towards said flat face of said valve body such that said valve disc contacts said upper portion of said resilient peripheral member thereby compressing said peripheral member until said peripheral member is flush with said flat face of said valve body to prevent a fluid from flowing from said fluid inlet into said valve chamber, and wherein said bottom face of said diaphragm contacts said flat face of said valve body thereby eliminating a dead volume by eliminating said valve chamber.

2. A valve structure in accordance with claim 1, wherein said peripheral member further comprises means forming a stepped hole arranged concentrically with said fluid inlet port said hole opening onto said valve chamber, and a valve seat composed of a resilient material, said valve seat comprising a stepped element on a circumference thereof corresponding to and fitted in said stepped hole.

3. A valve structure being alternately disposable between an open position and a closed position, said valve structure comprising a valve body having a flat face, and at least one fluid inlet port and a fluid outlet port which open onto said flat face, a diaphragm having a circumference thereof fixed to said flat face of said valve body, and a resilient valve disc arranged on a substantial center of said diaphragm, said valve disc moving between a closed position and an open position, said valve disc having a disc-like projection protruding out of a bottom face of said diaphragm, wherein said valve disc is pressed against said fluid inlet port at a peripheral portion thereof in the closed position, so that said disc-like projection of said resilient valve disc is compressed by said flat face of said valve body to prevent a fluid from flowing through said fluid inlet port, while the bottom face of said diaphragm is disposed in contact with said fluid outlet port to prevent the fluid from flowing through said fluid outlet port, and wherein said valve disc is separated from said peripheral portion of said fluid inlet port in the open position, so that said disc-like projection of said resilient valve disc is restored to allow the fluid to flow through said fluid inlet port, while the bottom face of said diaphragm is separated from said fluid outlet port to allow the fluid to flow through said fluid outlet port.

4. A solenoid-operated valve comprising a fluid inlet port and a fluid outlet port arranged on a flat face of a valve body, said solenoid-operated valve further comprising a diaphragm having a circumference thereof fixed on said flat face of said valve body, a valve disc formed in a rod arranged on a substantial center of said diaphragm, said valve disc being driven by means of a solenoid connected with said rod to move said valve disc between a closed position and an open position, and a peripheral member for defining said fluid inlet port, said peripheral member being composed of a resilient material and having a projection element protruded into said valve chest, wherein said valve disc is pressed against said peripheral member of said fluid inlet port in the closed position, so that said projection element of said resilient peripheral member is compressed by a bottom face of said valve disc to prevent a fluid from flowing through said fluid inlet port, while a bottom face of said diaphragm is disposed in contact with said fluid outlet port formed in said flat face of said valve body to prevent the fluid from flowing through said fluid outlet port, and wherein said valve disc is separated from said peripheral member of said fluid inlet port in the open position, so that said projection element of said resilient peripheral member is restored to allow the fluid to flow through said fluid inlet port, while the bottom face of said diaphragm is separated from said fluid outlet port to allow the fluid to flow through said fluid outlet port.

5. A solenoid-operated valve comprising a fluid inlet port and a fluid outlet port arranged on a flat face of a valve body, said solenoid-operated valve further comprising a diaphragm having a circumference thereof fixed on said flat face of said valve body, and a resilient valve disc formed in a rod arranged on a substantial center of said diaphragm, said valve disc being driven by means of a solenoid connected with said rod to move said valve disk between a closed position and an open position, said valve disc having a disc-like projection protruding out of a bottom face of said diaphragm, wherein said valve disc is pressed against said fluid inlet port at a peripheral portion thereof in the closed position, so that said disc-like projection of said resilient valve disc is compressed by said flat face of said valve body to prevent a fluid from flowing through said fluid inlet port, while the bottom face of said diaphragm being is disposed in contact with said fluid outlet port to prevent the fluid from flowing through said fluid outlet port, and wherein said valve disc is separated from said peripheral portion of said fluid inlet port in the open position, so that said disc-like projection of said resilient valve disc is restored to allow the fluid to flow through said fluid inlet port, while the bottom face of said diaphragm is separated from said fluid outlet port to allow the fluid to flow through said fluid outlet port.

6. A valve structure being alternately disposable between an open position in which a valve element is separated from at least one fluid inlet port to allow a fluid to flow through said at least one fluid inlet port and a closed position in which said valve element closes said at least one fluid inlet port to prevent a fluid from flowing through said at least one fluid inlet port, said valve structure comprising a valve body having a flat face, said at least one fluid inlet port being arranged in a substantial center of said flat face, and at least one fluid outlet port being arranged in a location on said flat face where said at least one fluid outlet port does not interfere with said at least one fluid inlet port, a diaphragm having a flat face that corresponds to said flat face of said valve body, said diaphragm having a circumference thereof fixed to said flat face of said valve body, and a valve disc arranged on a substantial center of said diaphragm, said valve disc having a resilient disc-like projection protruding out of a portion of said flat face of said diaphragm corresponding in location to said fluid inlet port, wherein, in the open position, said resilient disc-like projection is separated from said flat face of said valve body, thereby opening said fluid inlet port, while a center of said diaphragm concurrently curves upward to form a valve chamber between said diaphragm and said valve body, and wherein, in the closed position, said resilient disc-like projection contacts said at least one fluid inlet port and said flat face of said valve body, thereby closing said fluid inlet port, while said resilient disc-like projection is compressed to a level substantially identical with said flat face of said diaphragm by being pressed against said flat face of said valve body, so that said flat face of said diaphragm contacts said flat face of said valve body, eliminating said valve chamber.

7. A solenoid-operated valve capable of being alternately disposed by a solenoid between an open position in which a valve element is separated from at least one fluid inlet port to allow a fluid to flow through said at least one fluid inlet port and a closed position in which said valve body closes said at least one fluid inlet port to prevent a fluid from flowing through said at least one fluid inlet port, said valve structure comprising a valve element having a flat face, said at least one fluid inlet port being arranged in a substantial center of said flat face, and at least one fluid outlet port being arranged in a location on said flat face where said at least one fluid outlet port does not interfere with said at least one fluid inlet port, a diaphragm having a flat face that corresponds to said flat face of said valve body, said diaphragm having a circumference thereof fixed to said flat face of said valve body, a valve disc arranged on a substantial center of said diaphragm, said valve disc having a flat press portion on a portion of said flat face of said diaphragm corresponding to the location of said fluid inlet port, and a resilient peripheral member for defining said at least one fluid inlet port, said peripheral member protruding into a valve chamber, wherein, in the open position, said press portion is separated from said resilient peripheral member, thereby opening said fluid inlet port, while a center of said diaphragm concurrently curves upward to form said valve chamber between said diaphragm and said valve body, and wherein, in the closed position, said press portion compresses said peripheral member to a level substantially identical with said flat face of said valve body, thereby closing said at least one fluid inlet port and pressing said flat face of said diaphragm against said flat face of said valve body, eliminating said valve chamber.

8. A solenoid-operated valve capable of being alternately disposed by a solenoid between an open position in which a valve element is separated from at least one fluid inlet port to allow a fluid to flow through said at least one fluid inlet port and a closed position in which said valve element closes said at least one fluid inlet port to prevent a fluid from flowing through said at least one fluid inlet port, said valve structure comprising a valve body having a flat face, said at least one fluid inlet port being arranged in a substantial center of said flat face, and at least one fluid outlet port being arranged in a location on said flat face where said at least one fluid outlet port does not interfere with said at least one fluid inlet port, a diaphragm having a flat face that corresponds to said flat face of said valve body, said diaphragm having a circumference thereof fixed to said flat face of said valve body, and a valve disc arranged on a substantial center of said diaphragm, said valve disc having a resilient disc-like projection protruding out of a portion of said flat face of said diaphragm corresponding to the location of said fluid inlet port, wherein, in the open position, said resilient disc-like projection is separated from said flat face of said valve body, thereby opening said fluid inlet port, while a center of said diaphragm concurrently curves upward to form a valve chamber between said diaphragm and said valve body, and wherein, in the closed position, said resilient disc-like projection contacts said at least one fluid inlet port and said flat face of said valve body, thereby closing said fluid inlet port, while said resilient disc-like projection is compressed to a level substantially identical with said flat face of said diaphragm by being pressed against said flat face of said valve body, so that said flat face of said diaphragm contacts said flat face of said valve body, eliminating said valve chamber.

* * * * *